2,837,410

MANUFACTURE OF STABILIZED CONCENTRATED HYDRAZINE COMPOSITIONS

John F. Haller, Niagara Falls, N. Y., assignor to Olin Mathieson Chemical Corporation, a corporation of Virginia No Drawing. Application December 24, 1954
Serial No. 477,598

18 Claims. (Cl. 23—190)

This invention relates to the stabilization of concentrated hydrazine, providing, more particularly, a process for the stabilization of hydrazine containing 95 percent or more of anhydrous hydrazine and a stabilized concentrated hydrazine product.

This application is a continuation-in-part of my co-pending application Serial No. 297,761, filed July 8, 1952, and now abandoned.

Hydrazine has been known for a long time. It has usualy been available only in the form of its salts and as hydrazine hydrate, a constant boiling composition comprising approximately 2 parts by weight of hydrazine to 1 part by weight of water. More recently, however, substantially anhydrous hydrazine comprising at least 95 percent $N_2H_4$ by weight has become an article of commerce. Hydrazine hydrate is comparatively stable in storage and use compared to the 95 percent hydrazine. The latter can decompose in storage, particularly in the presence of certain metals or metal compounds. Stabilization of the concentrated hydrazine with respect to decomposition is important in order to avoid extensive losses and hazard in manufacture, in storage and in use.

I have discovered that the stability of concentrated hydrazine, particularly as prepared by the Raschig process, is associated with a property most simply explained as its potential acidity which can be neutralized, treating the hydrazine as the dissociating medium or solvent, by the addition of basic substances. I have also found that the corrosiveness of hydrazine to metals is associated with this same property. By further investigation, I have found that the potential acidity causing undesirable instability and corrosiveness can be satisfactorily neutralized and buffered by addition of a small amount of a metal oxide which is not reactive with hydrazine and which functions as a weak base. Suitable metal oxides for this purpose are aluminum oxide, zinc oxide and cadmium oxide. For example, the addition of a small amount of zinc oxide stabilizes concentrated hydrazine, buffering it so that the resulting product has markedly improved resistance to decomposition. Hydrazine solutions of a greater concentration than hydrazine hydrate up to substantially anhydrous 100 percent hydrazine can be stabilized by this means. Suitable proportions of the oxides can vary from about 0.2 to 5 percent by weight. Ordinarily about 1 percent of the oxide gives satisfactory results. Less than the lower limit recited may be insufficient and more than the upper limit does not appear to be necessary. The oxides used can be chemically pure or can be an ordinary commercial grade.

The oxide can be added to the hydrazine during manufacture to prevent its decomposition at any stage where the concentration is greater than that of hydrazine hydrate. It can be added to finished 95 percent by weight hydrazine as it is loaded into drums or tank cars for storage or shipment. The insoluble excess oxide is easily removed by settling and decanting or by filtration, and the hydrazine product can be distilled prior to use if deemed necessary or desirable.

In a particularly advantageous modification of the present invention, the metal oxide such as cadmium oxide, is used as stabilizing agent in fractionating columns in which hydrazine having a concentration greater than that of hydrazine hydrate is produced. In steel equipment used in extractive distillation processes for the dehydration of hydrazine hydrate to form substantially anhydrous hydrazine, serious decomposition difficulties are encountered. Introduction of cadmium oxide or other metal oxide into the fractionating column effectively avoids such decomposition and stabilizes the hydrazine. The cadmium oxide, for example, can be introduced by any suitable means, for example, by saturating the hydrazine hydrate feed with cadmium oxide. A particularly advantageous mode of introducing the cadmium oxide comprises preparing a slurry of cadmium oxide in water or hydrazine hydrate and pumping the slurry into the top of the tower before continuous operation begins. The slurry can also be introduced in the same way while operating. Using extractive distillation with aniline to dehydrate hydrazine hydrate, for example, as described in copending application Serial No. 361,185, filed June 12, 1952, now Patent Number 2,773,814, the cadmium oxide can be slurried with aniline, water or hydrazine hydrate and introduced into the top of the column. Aniline is circulated through the system from the reboiler to the top of the column for several hours at operating temperatures and the continuous operation is then started by feeding hydrazine hydrate to the column. The cadmium oxide becomes distributed on the trays and prevents hydrazine decomposition in the tower. In one such operation after such a cadmium oxide treatment, the column operated continuously for 21 days and then was shut down for other reasons.

EXAMPLES 1–6

To determine the decomposition rate of hydrazine as such and with various added catalytic metal ions and after stabilization by means of zinc oxide, 96.8 percent by weight hydrazine, the remainder being water, was refluxed at atmospheric pressure in a glass apparatus. The gases first evolved were discarded and later the gases were collected and measured in a burette. After an initial period the decomposition proceeded at a substantially constant rate. The observed rates of decomposition are shown in the following table:

Table

| Example No. | Accelerator Added | Decomposition, Percent/day | | Decomposition Rate Ratio With ZnO/Without ZnO |
|---|---|---|---|---|
| | | Without ZnO | With ZnO | |
| 1 | None | 0.0918 | 0.0027 | 1/34 |
| 2 | $Ni(OCOCH_3)_2.4H_2O$ | .0875 | .0043 | 1/20 |
| 3 | $Fe(OH)(OCOCH_3)_2$ | .235 | .013 | 1/18 |
| 4 | $Al_2(SO_4)_3.18H_2O$ | .116 | .0012 | 1/97 |
| 5 | $Cr_2(SO_4)_3.5H_2O$ | .308 | .0027 | 1/114 |
| 6 | $Cu(OCOCH_3)_2.H_2O$ | .166 | .0006 | 1/277 |

In each of the six examples, 150 grams of hydrazine was heated under reflux. When a metallic compound was added as an accelerator the concentration of metal was 20 parts per million. In Example 1, 2 percent by weight of zinc oxide based on the hydrazine was added. In Examples 2 to 6 the amount of zinc oxide added was 1 percent by weight based on the hydrazine originally charged. In most of the accelerated but unstabilized samples, the test was run for about 2.6 to 5.3 hours. In the case of the stabilized samples, the time required to obtain an accurately measurable sample varied from about 4.5 to 45 hours. The temperature of the refluxing hydrazine was about 113° C.

Example 1 shows that in the absence of metals 96.8 percent hydrazine is characterized by a definitely measurable decomposition rate and that the addition of 2 percent of zinc oxide reduces the rate of decomposition to about 1/34 of that obtained in the absence of zinc oxide.

Example 2 shows that while nickel acetate does not appear to accelerate the decomposition of boiling hydrazine, it does not materially interfere with the stabilizing effect of added zinc oxide.

Example 3 shows the very marked increase in decomposition rate by the addition of a ferric salt and the ability of zinc oxide to reduce the decomposition rate to a very satisfactory extent.

Example 4 shows the accelerating effect of added aluminum sulfate and the ability of zinc oxide to counteract that effect.

Example 5 shows the greatest acceleration of decomposition of any of the salts tested and again the effectiveness of zinc oxide in erasing the accelerating effect of the added chromium sulfate.

Example 6 shows the effectiveness of zinc oxide in overcoming the acceleration of decomposition by cupric acetate.

EXAMPLE 7

An azeotrope still having a diameter of about 2.5 feet and a height of about 60 feet and containing the equivalent of about 10 theoretical plates was treated with a slurry of 10 pounds of cadmium oxide in 40 pounds of hydrazine hydrate. The slurry was prepared by adding the cadmium oxide to the hydrazine hydrate in a drum with stirring. The slurry thus formed was forced by means of nitrogen pressure onto a plate near the top of the column. Aniline circulation was started by introducing fresh aniline through the aniline make-up line located somewhat above the middle of the column, heating the aniline in the reboiler, distilling the aniline overhead, and condensing and recycling it to the aniline make-up line entering the tower. When small amounts of cadmium oxide eventually appeared in the form of suspended particles in the reboiler liquid, normal operation was started by feeding hydrazine hydrate to the column.

In this normal operation, the still was operated at about atmospheric pressure with a top temperature of about 100° C. and had a bottom temperature of about 130° C. A feed stream consisting of 7.1 percent hydrazine, 6.4 percent water and 86.5 percent aniline having a mole ratio of hydrazine to water of 0.624:1 and of aniline to hydrazine of 4.19 to 1 was continuously introduced into the aniline make-up line. A substantially hydrazine-free mixture of water and aniline was produced as overhead and a mixture of 7.7 percent hydrazine, 0.4 percent water and 91.9 percent aniline was produced as bottoms. Substantially anhydrous (95.4 percent) hydrazine was recovered therefrom by distillation at a 4:1 reflux ratio in a hydrazine still having 7 to 9 theoretical plates. Continuous normal operation was carried out for 21 days without interruption and was operating satisfactorily without hydrazine decomposition when the operation was shut down for other reasons. The particular amount of cadmium oxide employed in this run of 21 days was not critical, inasmuch as satisfactory results can also be obtained using 5 pounds or 30 pounds of cadmium oxide instead of 10 pounds. In attempts to operate this process without the addition of an oxide, no run exceeded about 16 hours without serious, sometimes violent decomposition. Usually such decomposition set in before any satisfactory 95 percent hydrazine was produced.

In this example neutralization and stabilization of the hydrazine was effected in the azeotrope still by the introduction of cadmium oxide. Further treatment with cadmium oxide in the hydrazine still was not additionally necessary. Cadmium oxide treatment in the hydrazine still is, however, desirable when such treatment is not used in the azeotrope still or when the history of the hydrazine is uncertain or some time has elapsed after treatment according to the process of this invention.

EXAMPLE 8

In parallel tests, a sample of 96.8 percent hydrazine alone and a sample of the same hydrazine to which 1 percent by weight of activated alumina (Alcoa F-20) based on the hydrazine was added were heated under reflux, collecting the evolved gases. Decomposition of the untreated hydrazine occurred at the rate of 0.142 percent per 24-hour day and at the rate of 0.069 percent per day for the sample containing alumina.

I claim:

1. In a method for the manufacture of concentrated hydrazine compositions having a molar hydrazine-water ratio greater than that of hydrazine hydrate, the step of incorporating into the hydrazine composition a metal oxide selected from the group consisting of aluminum oxide, zinc oxide and cadmium oxide in amount sufficient to substantially inhibit the decomposition of hydrazine.

2. A method according to claim 1 in which said metal oxide is aluminum oxide.

3. A method according to claim 1 in which said metal oxide is zinc oxide.

4. A method according to claim 1 in which said metal oxide is cadmium oxide.

5. In a method for the manufacture of concentrated hydrazine having a molar hydrazine-water ratio greater than that of hydrazine hydrate involving fractionally distilling aqueous hydrazine, the step of incorporating into the hydrazine being fractionally distilled a metal oxide selected from the group consisting of aluminum oxide, zinc oxide and cadmium oxide in amount sufficient to substantially inhibit the decomposition of the hydrazine undergoing fractionation.

6. A method according to claim 5 in which said metal oxide is aluminum oxide.

7. A method according to claim 5 in which said metal oxide is zinc oxide.

8. A method according to claim 5 in which said metal oxide is cadmium oxide.

9. The method of stabilizing concentrated hydrazine compositions having a molar hydrazine-water ratio greater than that of hydrazine hydrate which comprises incorporating therein a metal oxide selected from the group consisting of aluminum oxide, zinc oxide, and cadmium oxide in amount sufficiently to substantially inhibit the decomposition of the hydrazine.

10. A method according to claim 9 in which said metal oxide is aluminum oxide.

11. A method according to claim 9 in which said metal oxide is zinc oxide.

12. A method according to claim 9 in which said metal oxide is cadmium oxide.

13. A method according to claim 9 in which the amount of said metal oxide incorporated into the hydrazine is within the range from about 0.2 to 5 percent by weight, based upon the weight of the hydrazine.

14. A stabilized concentrated hydrazine product which consists essentially of a concentrated hydrazine composition having a molar hydrazine-water ratio greater than that of hydrazine hydrate to which has been added a metal oxide selected from the group consisting of aluminum oxide, zinc oxide and cadmium oxide in amount sufficient to inhibit the decomposition of the hydrazine.

15. A product according to claim 14 in which said metal oxide is aluminum oxide.

16. A product according to claim 14 in which said metal oxide is zinc oxide.

17. A product according to claim 14 in which said metal oxide is cadmium oxide.

18. A product according to claim 14 in which the amount of said metal oxide added is within the range from about 0.2 to 5 percent by weight, based upon the weight of the hydrazine.

References Cited in the file of this patent

UNITED STATES PATENTS

| | | |
|---|---|---|
| 2,583,584 | Marshall | Jan. 29, 1952 |
| 2,675,299 | Haller | Apr. 13, 1954 |
| 2,675,300 | Haller | Apr. 13, 1954 |
| 2,697,026 | Mantell et al. | Dec. 14, 1954 |